United States Patent
Lauffer et al.

(10) Patent No.: US 10,037,031 B2
(45) Date of Patent: Jul. 31, 2018

(54) VEHICLE OPERATION STATES

(71) Applicant: Ford Global Technologies, LLC, Dearborn, MI (US)

(72) Inventors: Scott J. Lauffer, Northville, MI (US); John P. Joyce, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/016,308

(22) Filed: Feb. 5, 2016

(65) Prior Publication Data

US 2017/0227959 A1    Aug. 10, 2017

(51) Int. Cl.
| | |
|---|---|
| *G05D 1/00* | (2006.01) |
| *B60W 40/02* | (2006.01) |
| *B60W 50/00* | (2006.01) |
| *B60W 50/08* | (2012.01) |
| *B60W 50/12* | (2012.01) |
| *B60K 28/06* | (2006.01) |

(52) U.S. Cl.
CPC ........... *G05D 1/0061* (2013.01); *B60W 40/02* (2013.01); *B60W 50/0098* (2013.01); *B60W 50/087* (2013.01); *G05D 1/0088* (2013.01); *B60K 28/06* (2013.01); *B60W 50/12* (2013.01); *B60W 2050/0071* (2013.01); *B60W 2540/00* (2013.01); *B60W 2540/22* (2013.01); *B60W 2540/26* (2013.01)

(58) Field of Classification Search
None
See application file for complete search history.

(56) References Cited

U.S. PATENT DOCUMENTS

| | | |
|---|---|---|
| 5,428,531 A | 6/1995 | Hayafune |
| 6,266,603 B1 | 7/2001 | Taffin et al. |
| 7,894,951 B2 | 2/2011 | Norris et al. |
| 8,818,608 B2 | 8/2014 | Cullinane et al. |
| 8,874,301 B1 | 10/2014 | Rao et al. |
| 8,954,217 B1 * | 2/2015 | Montemerlo ......... B60W 30/00 701/26 |
| 2014/0358353 A1 | 12/2014 | Ibanez-Guzman et al. |
| 2015/0094898 A1 | 4/2015 | Tellis et al. |

(Continued)

FOREIGN PATENT DOCUMENTS

| | | |
|---|---|---|
| EP | 2168835 B1 | 5/2012 |
| WO | 2011147614 A1 | 12/2011 |

OTHER PUBLICATIONS

"Autonomous car", Wikipedia, https://en.wikipedia.org/wiki/Autonomous_car, (17 pages).

(Continued)

*Primary Examiner* — Lail A Kleinman
(74) *Attorney, Agent, or Firm* — Frank A. MacKenzie; Bejin Bieneman PLC (57) ABSTRACT

Upper and lower limits of one or more parameters are established for each of a plurality of states of operation of a vehicle. One of the plurality of states for operating the vehicle is identified based at least in part on the parameters, data describing a human operator, and data describing an environment around the vehicle. A vehicle subsystem is actuated according to an operation mode corresponding to the current operating state.

18 Claims, 7 Drawing Sheets

(56) References Cited

U.S. PATENT DOCUMENTS

| | | | |
|---|---|---|---|
| 2015/0149036 A1* | 5/2015 | You | B60W 30/12 |
| | | | 701/41 |
| 2015/0233719 A1* | 8/2015 | Cudak | B60K 35/00 |
| | | | 701/23 |
| 2016/0304099 A1 | 10/2016 | Hatakeyama | |
| 2017/0015318 A1* | 1/2017 | Scofield | G08G 1/0112 |

OTHER PUBLICATIONS

Litman, "Autonomous Vehicle Implementation Predictions", Victoria Transport Policy Institute, Aug. 24, 2015, (21 pages).
"Transportation, Space, and Technology Program" RAND, (208 pages).
United Kingdom Intellectual Property Office Search Report under Section 17(5) for Application No. GB1701742.7 dated Aug. 1, 2017 (4 pages).

\* cited by examiner

VEHICLE OPERATION STATES

BACKGROUND

A vehicle may operate autonomously or semi-autonomously, i.e., without input from a human operator to control some or all driving operations, e.g., some or all of steering, propulsion (e.g., throttle), and braking. Autonomous or semi-autonomous operation may not be suitable and/or desired for all driving situations. The human operator may provide input to switch the vehicle to full or partial manual control. However, the human operator may be or become distracted or drowsy, potentially impairing manual control of the vehicle.

DETAILED DESCRIPTION

Figure 1:
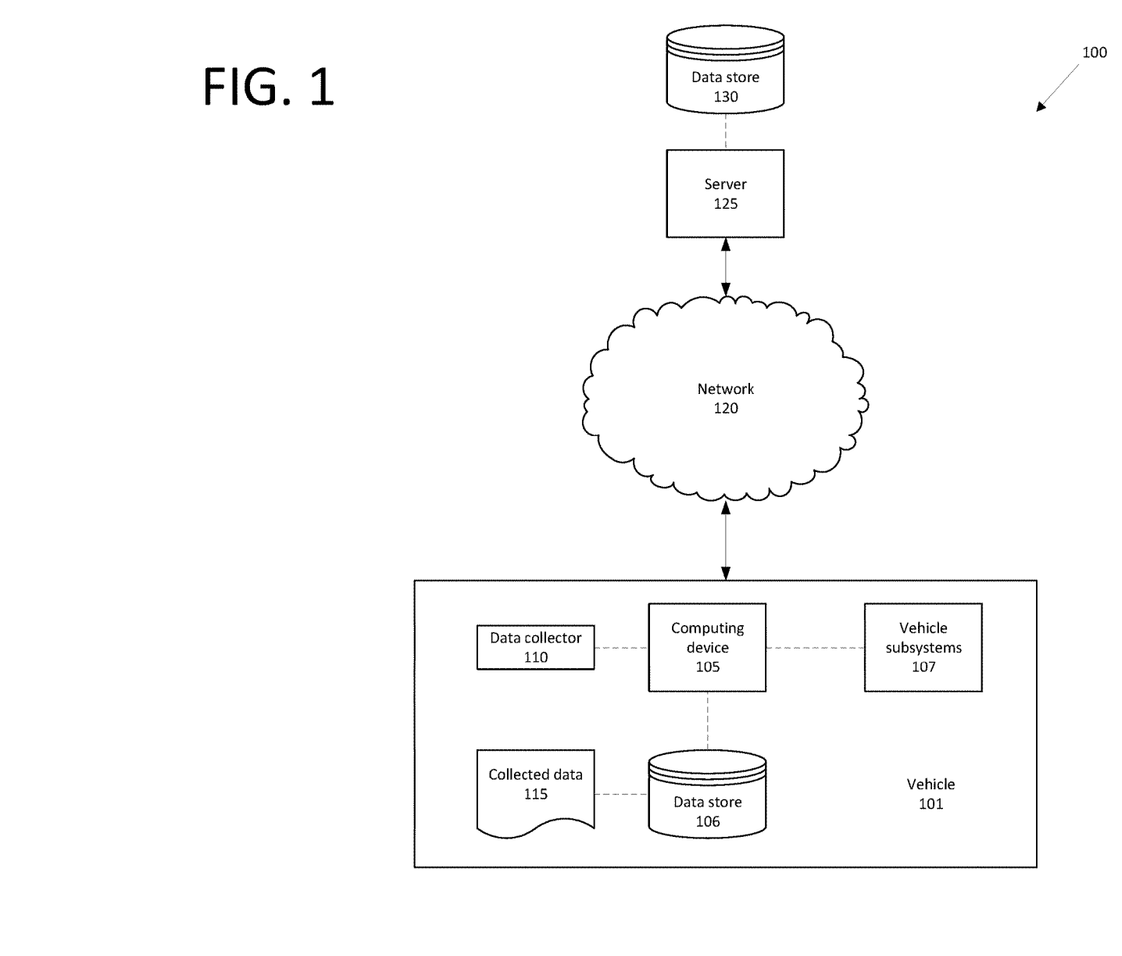
FIG. 1 is a block diagram of an example system for controlling vehicle operation states.

With reference to FIG. 1, a vehicle 101 system 100 can include a plurality of possible modes of operation of the vehicle 101, e.g., various levels of control for one or more vehicle 101 subsystems. For example, one possible implementation includes four vehicle operation modes: fully manual, shared operation, limited shared operation, and fully autonomous. The vehicle operation modes may be selected according to corresponding states of operation of the vehicle 101. A vehicle 101 computer 105 may be programmed to operate various vehicle subsystems, i.e., as a virtual operator of one or more vehicle 101 subsystems 107, and/or to set limits on the operation of the subsystems for the human operator based one of the four vehicle operation modes. A current operation state, used to select a current operating mode, may be determined by, e.g., environmental data, human operator biometric data, etc.

FIG. 1 illustrates an example system 100 for determining one or more vehicle operation 101 states, and for operating the vehicle 101 according to a selected state. The computing device 105 is programmed to receive collected data 115 from one or more data collectors 110, e.g., vehicle 101 sensors, concerning various metrics related to the vehicle 101. For example, the metrics may include a velocity of the vehicle 101, vehicle 101 acceleration and/or deceleration, data related to vehicle 101 path or steering, etc., including lateral acceleration, curvature of the road, biometric data related to a vehicle 101 operator, e.g., heart rate, respiration, pupil dilation, body temperature, state of consciousness, etc. Further examples of such metrics may include measurements of vehicle 101 systems and components (e.g. a steering system, a powertrain system, a brake system, internal sensing, external sensing, etc.). The computing device 105 may be programmed to collect data 115 from the vehicle 101 in which it is installed, sometimes referred to as a "host vehicle," and/or may be programmed to collect data 115 about and/or from, e.g., via DSRC communications or the like, a second vehicle, i.e., a vehicle other than the vehicle 101, e.g., a "target vehicle."

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

The vehicle 101 may include a plurality of subsystems 107. The subsystems 107 include, e.g., a propulsion subsystem (e.g. throttle), an entertainment subsystem, a steering subsystem, a climate control subsystem, etc. The computing device 105 may be programmed to operate some or all of the subsystems 107 with limited or no input from a human operator, i.e., the computing device 105 may be programmed to operate the subsystems 107 as a virtual operator. When the computing device 105 operates the subsystems 107 as a virtual operator, the computing device 105 ignores input from the human operator with respect to subsystems 107 selected for control by the virtual operator, which provides instructions, e.g., via a vehicle 101 communications bus and/or to electronic control units (ECUs) as are known, to actuate vehicle components, e.g., to apply brakes, change a steering wheel angle, etc. For example, if the human operator attempts to turn a steering wheel during virtual operator steering operation, the computing device 105 may ignore the movement of the steering wheel and steer the vehicle 101 according to its programming.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101, including the host vehicle and/or the target vehicle. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to determine environmental data, e.g., to measure a distance between the vehicle 101 and other vehicles or objects, the kinds of objects near the trajectory of the vehicle 101, the road conditions, locations of roads and traffic signs, etc. Yet other data collectors 110 could include cameras, breathalyzers, motion detectors, etc., i.e., data collectors 110 to provide data 115 for evaluating a condition or state of a vehicle 101 operator.

Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by the data collectors 110 and/or computed from such data. The data 115 may include biometric data from the human operator, e.g., pulse, blood pressure, breathing rate, etc.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be programmed to determine an appropriate action for one or more vehicles 101, and to provide direction to the computer 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, records relating to potential incidents generated as described herein, lane departure profiles, etc. Further, the server 125 may store information related to particular vehicle 101 and additionally one or more other vehicles 101 operating in a geographic area, traffic conditions, weather conditions, etc., within a geographic area, with respect to a particular road, city, etc. The server 125 could be programmed to provide alerts to a particular vehicle 101 and/or other vehicles 101.

The vehicle 101 may be operated by a human operator, e.g., in a known manner. The computing device 105 may be programmed to operate the vehicle subsystems 107 with limited or no input from the human operator, i.e., the computing device 105 may operate the vehicle subsystems 107. Such programming as is presently known, and including possible future developments thereto, may be referred to as a "virtual operator," and may be stored in the data store 106 and/or the server 125.

In the example implementation discussed herein, the computing device 105 may operate the subsystems 107 in one of four vehicle 101 modes: manual, sharing, limited sharing, and fully autonomous. The four modes, each of which is described in more detail below, provide various amounts of control for human operators and virtual operators to allow for operation of the vehicle 101 when e.g., the human operator may not be fully attentive or may require a virtual operator's assistance. Corresponding states (e.g., manual, sharing, limited sharing, and fully autonomous) may be defined, e.g., according to one or more values of data from sensors 110, to determine selection of an operating mode for the vehicle 101. For example, when a vehicle operation state transitions from a first state to a second state, where the vehicle 101 is operating in a mode determined by the first state, a mode of operation that corresponds to the second state may be selected by the computing device 105, i.e., the computer 105 may implement to operate vehicle subsystems 107 according to input from a human operator and/or a virtual operator.

Figure 2:
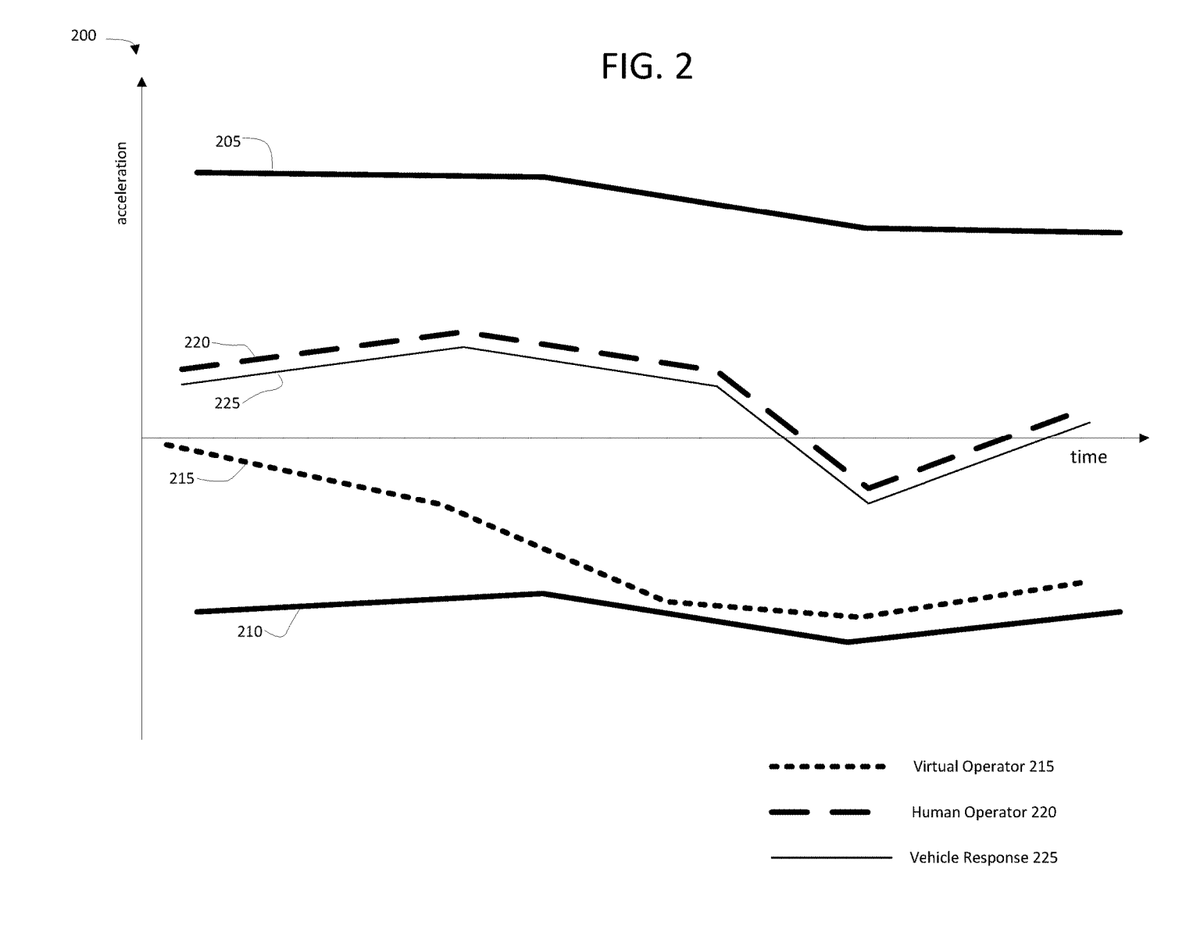
FIG. 2 is a chart of an example vehicle in a manual operation state.

FIG. 2 illustrates operation of the vehicle 101 in the manual mode. In this example chart 200, the vertical axis represents a parameter that may be controlled by either the human operator or the virtual operator, e.g. speed, acceleration, trajectory, braking, torque, road curvature, wheel angle, etc., and the horizontal axis represents time. In this example chart 200, the parameter on the vertical axis is acceleration. Upper and lower limits 205, 210 provide bounds for the parameters, above or below which, as the case may be, the vehicle 101 transitions out of the manual state according to which the manual mode was selected. That is, the chart 200 of FIG. 2 illustrates operation of the vehicle 101 over a period of time in a manual mode, and how the vehicle 101 responds to inputs from the human operator 220 during that time in the manual mode (and in the manual state), i.e., how one or more parameters measured along the y-axis, e.g., speed, acceleration, etc., vary over time. In the example chart of FIG. 2, the period of time shown may be 500 ms, and the example charts of FIGS. 2-6 may represent any selected period of time of vehicle 101 operation. The response curve 225 shows actual values of the parameter or parameters over the time period of the graph 200 which, as can be seen, tracks to the human operator input curve 220. The virtual operator predicted response curve 215 indicates inputs that the computing device 105 would have provided to the vehicle subsystems 107 in the time period represented in the graph 200, although in the manual mode, inputs of a human operator control operation of subsystems 107.

The chart 200 of FIG. 2 illustrates the vehicle 101 in the manual mode. In the manual mode, the vehicle 101 responds only to input from the human operator. As shown in FIG. 2, the vehicle response 225 follows input from the human operator 220, while not responding at all to input from the virtual operator 215. That is, regardless of the virtual operator 215 input, the vehicle subsystems 107 operate according to the input from the human operator 220. The computing device 105 may be programmed to transition only to the shared operation mode when currently in the manual mode.

Figure 3:
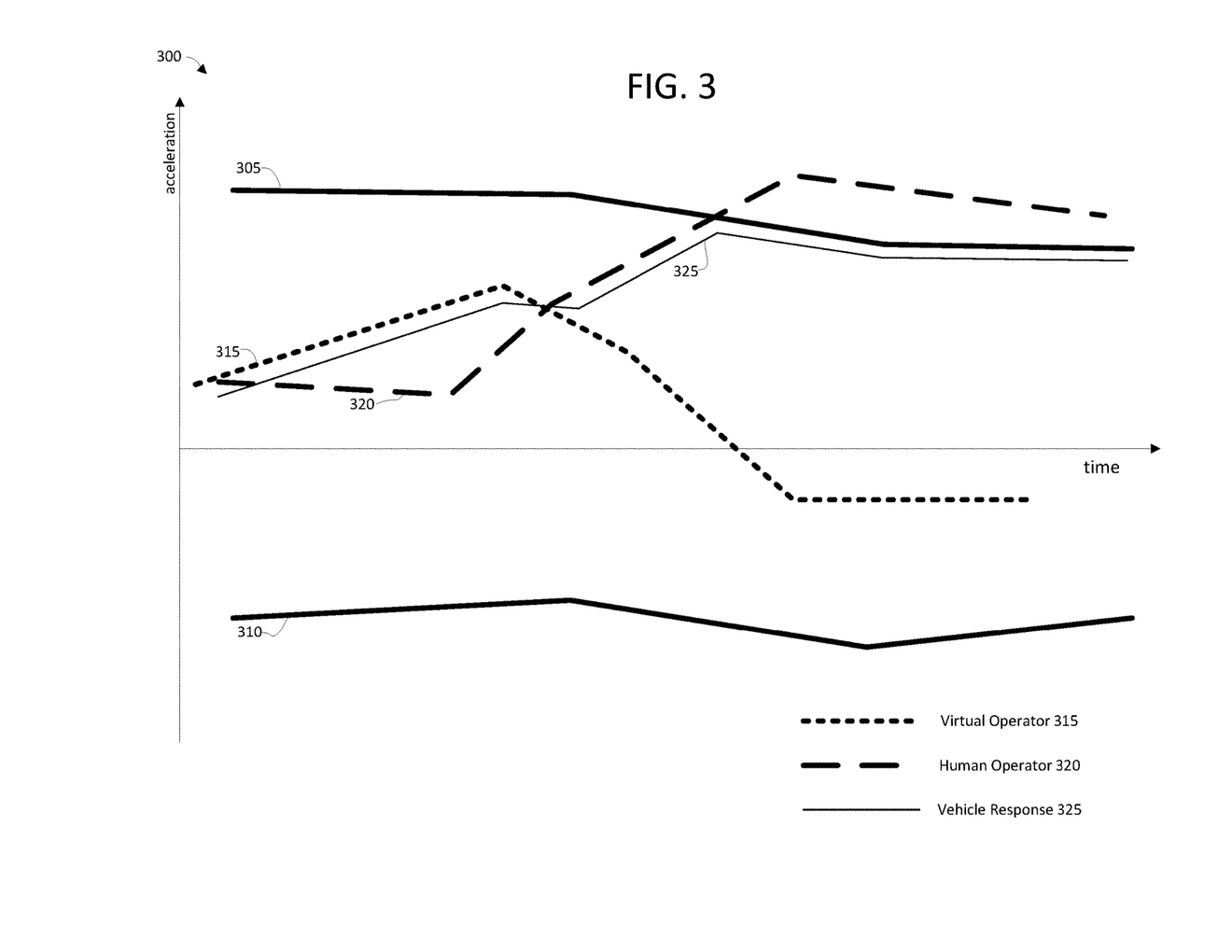
FIG. 3 is a chart of the example vehicle in a shared operation state.

FIG. 3 illustrates operation of the vehicle 101 in the shared operation mode. The example chart 300 illustrates acceleration over time, but could include any of a plurality of parameters, e.g., vehicle 101 speed, trajectory, etc. The chart 300 includes an upper limit 305 for virtual operator input and a lower limit 310 for virtual operator 315 input. In this example, the human operator 320 provides input that is within, and then, at a point in time, exceeds the virtual driver limits 305, 310. In the shared operation mode, the computing device 105 is programmed so that the vehicle response curve 325 follows the human operator curve 320 until the virtual operator limits 305, 310 are reached, at which point the vehicle 101 follows the virtual operator limits 305, 310. In this example, the human operator curve 320 exceeded the upper limit 305, so the vehicle response curve 325 follows the upper limit 305. The shared operation mode allows the vehicle response curve 325 to operate within the upper and lower limits 305, 310 while allowing the human operator curve 320 the option to control operation within the limits. For example, when the parameter along the vertical axis is vehicle 101 speed, the limits 305, 310 may correspond to the legal speed limit in the current area, the computing device 105 preventing the human operator curve 320 from exceeding the speed limit, but allowing control of the vehicle response curve 325 to remain with the human operator 320 below the speed limit.

Figure 4:
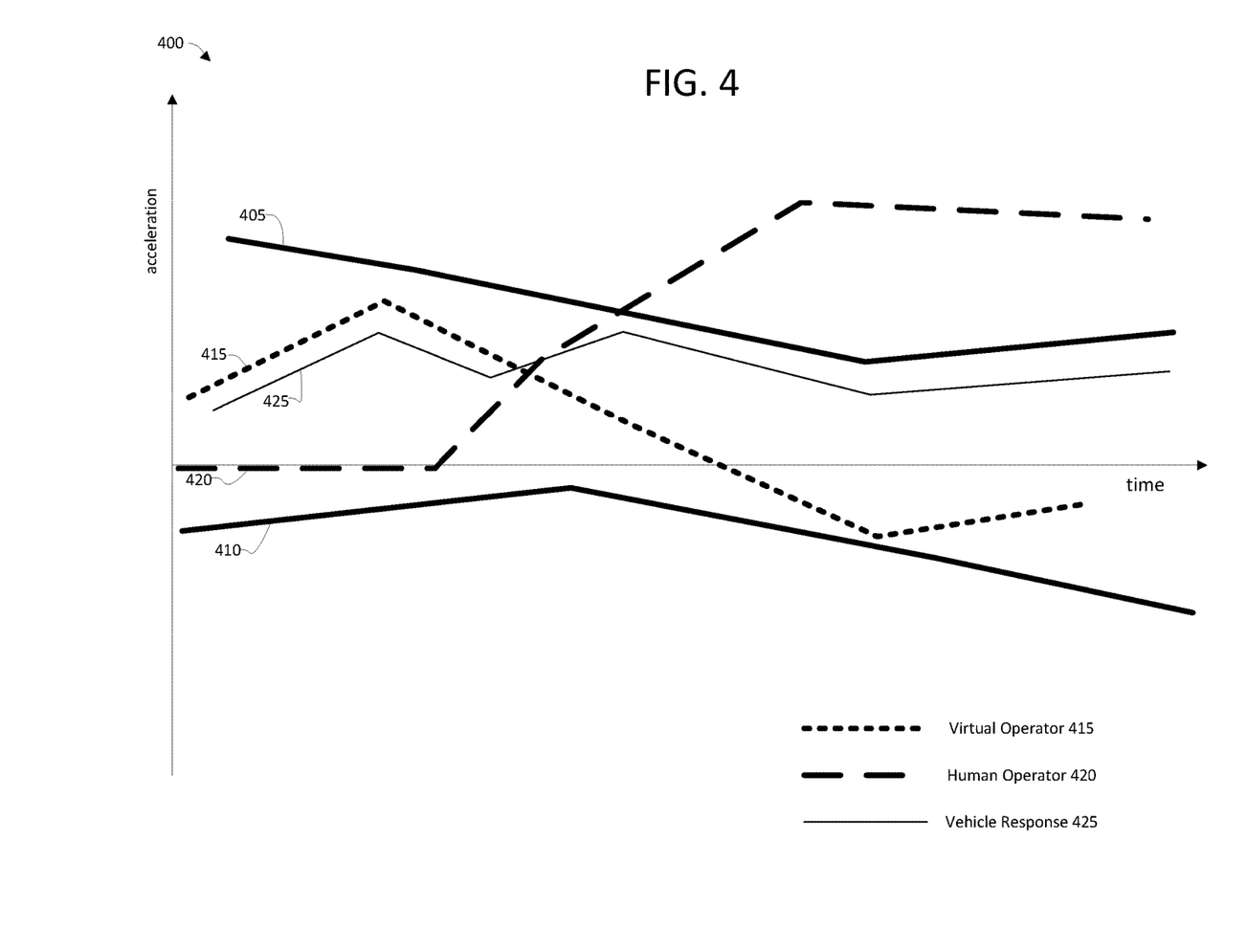
FIG. 4 is a chart of the example vehicle in a limited shared operation state.

FIG. 4 illustrates operation of the vehicle 101 in the limited shared operation mode. The example chart 400 illustrates acceleration over time, but could include any of a plurality of parameters, e.g., vehicle 101 speed, trajectory, etc. The chart 400 includes an upper limit 405 and a lower limit 410 for virtual operator 415 input. The upper limit 405 and the lower limit 410 may track the virtual operator 415 input more closely than the shared operation mode, i.e., the upper and lower limits 405, 410 maybe narrower than the limits 305, 310. The limits 405, 410 thus allow smaller deviations from the virtual operator 415 input than the limits 305, 310 allow from the virtual operator 315 input. The limited shared operation mode allows the human operator to control certain vehicle subsystems 107 after the vehicle 101 exits the fully autonomous mode. The human operator curve 420 input starts at 0, indicating that the human operator may be, e.g., sleeping, inattentive, incapable, etc., and may generally represent the human operator not providing input to the vehicle 101. During this initial period of time, the vehicle response curve 425 is controlled solely by the virtual operator curve 415.

When the human operator wants to provide input to the vehicle response curve 425, rather than moving directly to the shared or manual modes, the computing device 105 may allow the human operator to operate certain vehicle subsystems 107 in a limited shared operation mode. The limited shared operation mode allows limited control of the vehicle response curve 425 by the human operator. As shown in FIG. 4, when the human operator starts to provide input, the vehicle response curve 425 follows the direction of the virtual operator curve 415. However, after a period of time when the virtual operator curve 415 and the human operator curve 420 meet, the vehicle response curve 425 follows the human operator curve 420. When the human operator curve 420 exceeds the virtual operator limits 405, 410, however, the vehicle response curve 425 remains within the virtual operator limits 405, 410; in this example, the vehicle response curve 425 tracks the upper limit 405. The computing device 105 may selectively allow the human operator to provide input for specific subsystems 107, e.g. climate control and/or entertainment, for a period of time before allowing input for other subsystems 107, e.g. propulsion and/or steering. The computing device 105 may increase the number of subsystems 107 available for human operator input based on a confidence interval, being a level of confidence that the human operator is fully aware and able to operate the vehicle 101.

For example, the confidence interval may include data 115 from a camera detecting eye motion of the human operator, heart rate information from a heart rate sensor, e.g. a wearable heart rate monitor, etc. The computing device 105 may measure the eye movement of the human operator and the motion of the vehicle 101 and, in a known manner, determine whether the human operator, e.g., engages and follow the lane without drifting, maintains the posted speed limit, uses proper signaling for turns, etc. The confidence interval may include data on the occupants of the vehicle 101, e.g., whether a licensed operator is present, the licensed operator is in the operator's seat, etc., collected from data collectors 110 including, e.g., seat sensors, seat belt sensors, a destination entered into a vehicle HMI, whether a vehicle 101 door is open or closed, etc., as is known.

Figure 5:
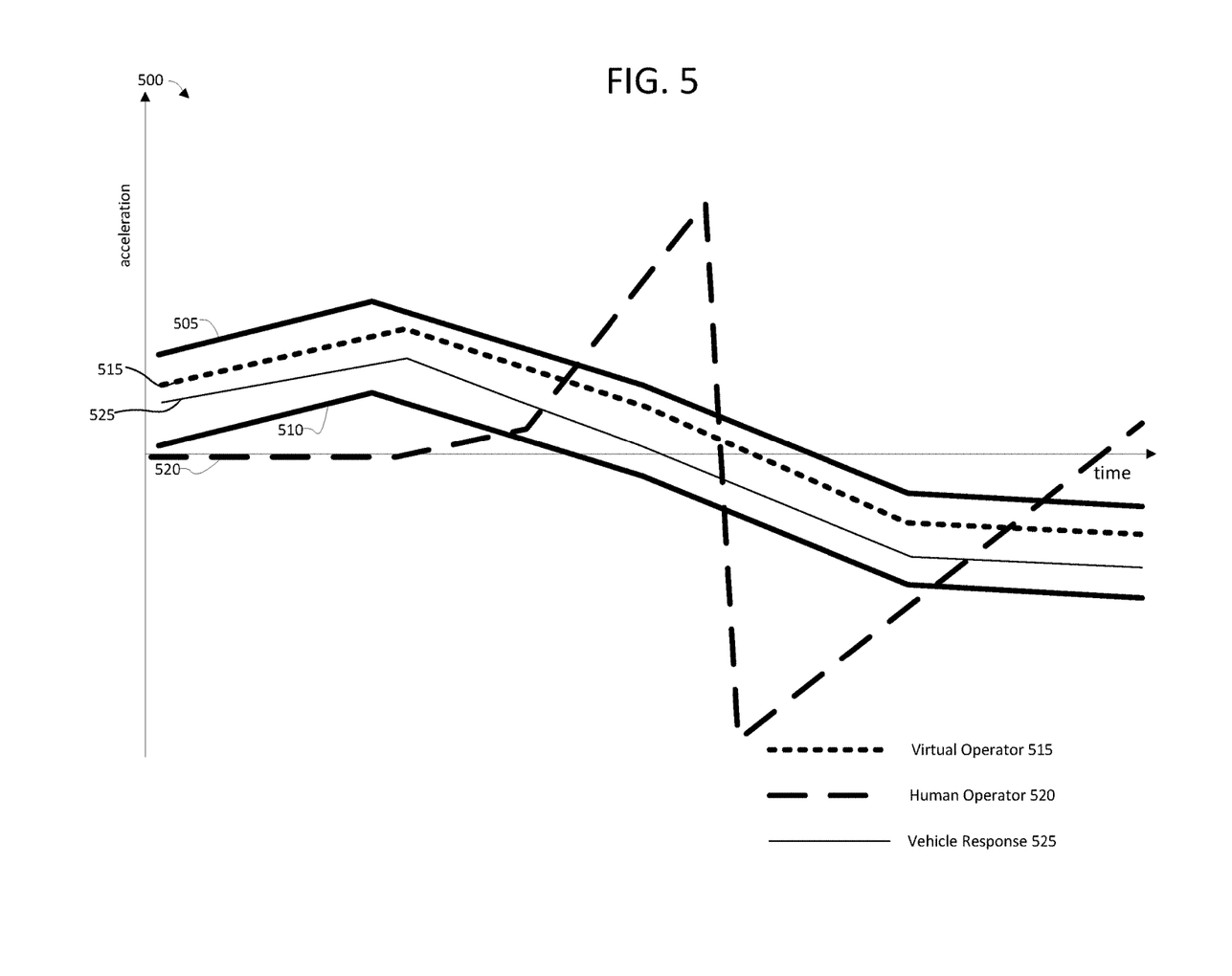
FIG. 5 is a chart of the example vehicle in a fully autonomous state.

FIG. 5 illustrates operation of the vehicle 101 in the fully autonomous mode. The example chart 500 illustrates acceleration over time, but could include any of a plurality of parameters, e.g., vehicle 101 speed, trajectory, etc. The chart 500 includes an upper limit 505 and a lower limit 510 for the virtual operator curve 515. Here, regardless of the human operator input, the vehicle response curve 525 tracks only the virtual operator curve 515. For example, if a sleeping human operator 520 kicks a gas pedal, inputting an increase in a throttle, the computing device 105 will ignore the human operator curve 520 and operate the vehicle subsystems 107 according to the input based on the virtual operator curve 515. The computing device 105 will continue operating in the fully autonomous mode until transitioning into the limited sharing mode based, e.g., on biometric information from the human occupant, the confidence interval, and/or environmental data. The computing device 105 may be programmed to transition only to the limited sharing state when currently in the fully autonomous state.

Figure 6:
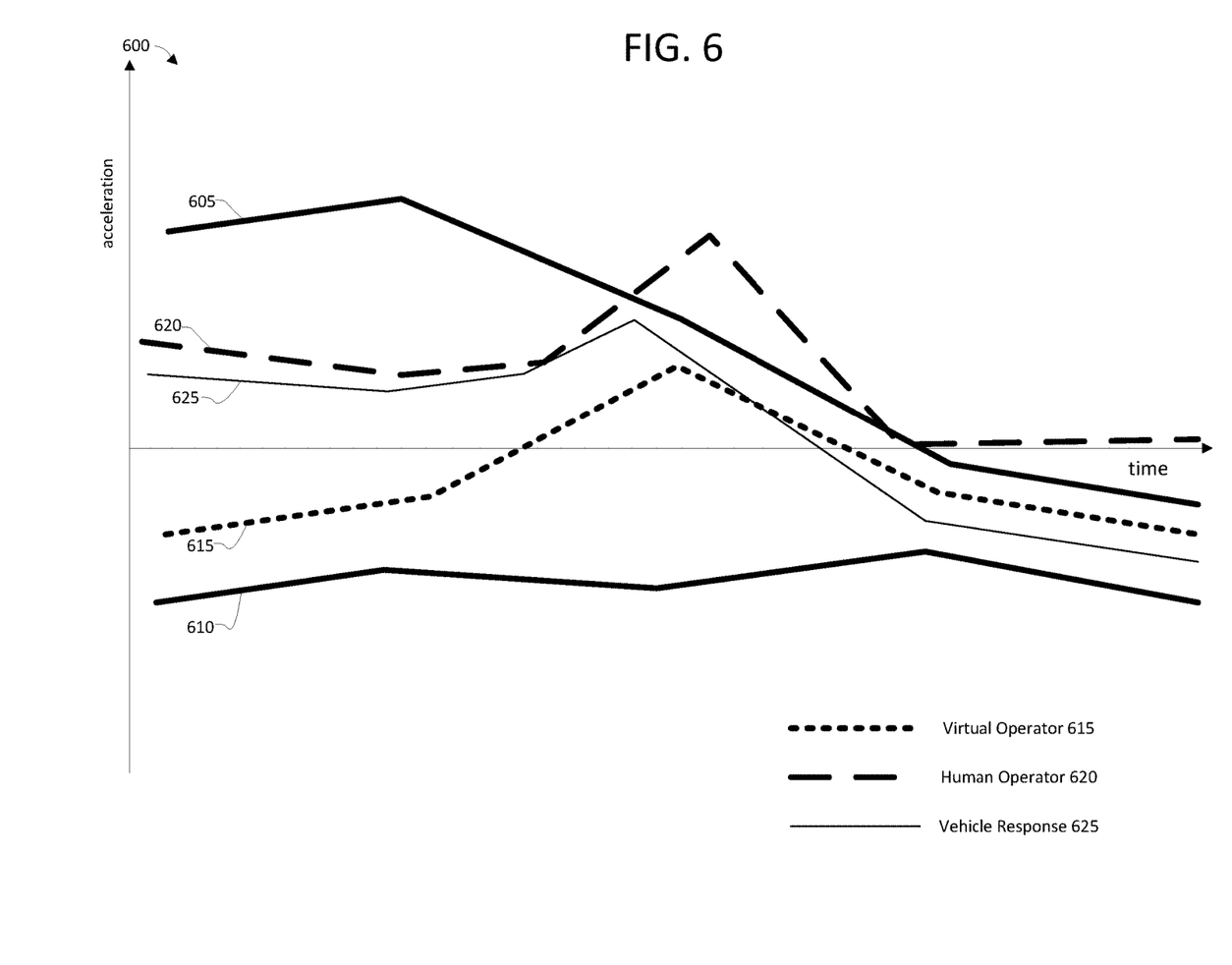
FIG. 6 is a chart of another example vehicle having selectively controlled subsystems.

FIG. 6 illustrates operation of the vehicle 101 where control of one or more selected subsystems 107 is switched from accepting input based on the human operator curve 620 to accepting input based on the virtual operator curve 615. That is, rather than selecting from the four modes described above, the computing device 105 may select one or more subsystems 107 to ignore human operator curve 620 and to track only the virtual operator curve 615. The example chart 600 illustrates acceleration over time and include a virtual operator upper limit 605 and a virtual operator lower limit 610. The computing device 105 may switch the subsystems 107 to virtual operator input based on, e.g. biometric information from the human operator. For example, if the human operator is distracted and/or falling asleep, the computing device 105 may select propulsion and steering subsystems for virtual operator control. As shown in FIG. 6, the vehicle response curve 625 initially tracks the human operator curve 620, but when the computing device 105 determines that virtual operator control is required, the computing device 105 may adjust the limits 605, 610 so that the vehicle subsystems 107 operate according to the virtual operator curve 615. The computing device 105 may selectively adjust the limits 605, 610 for individual subsystems 107 rather than, e.g., the shared and limited shared states described above which may prescribe operation of certain subsystems 107.

Figure 7:
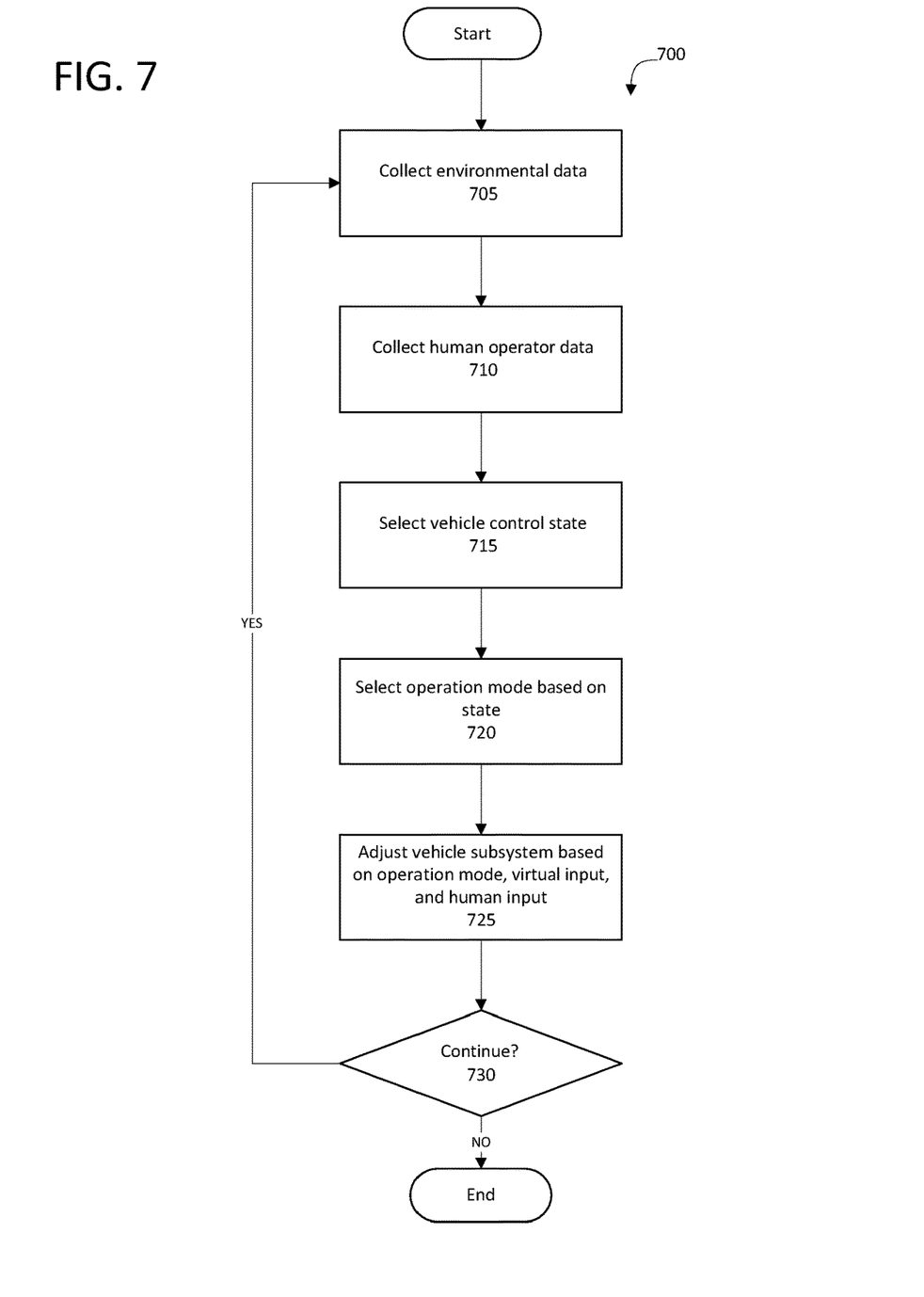
FIG. 7 illustrates a process for selecting a vehicle operation state.

FIG. 7 illustrates an example process 700 for switching between operation modes of the vehicle 101. The process 700 begins in a block 705, in which the computing device 105 collects environmental data 115 from the data collectors 110. The environmental data 115 may include, e.g., obstacles around the vehicle 101, other vehicles 101, road curvature, traffic signs, road crossings, etc. The computer 105 may use the environmental data 115 in recommending operation of one or more vehicle subsystems 107 by the virtual operator.

Next, in a block 710, the computing device 105 collects human operator data 115. The human operator data 115 may include biometric data, e.g., pulse, breath rate, drowsiness, alertness, attentiveness, etc. The computing device 105 may use the human operator data to determine whether the human operator is aware and able to operate the vehicle 101, e.g., systems and methods are known to determine whether a person is awake or asleep, drunk or sober, a blood alcohol level, etc.

Next, in a block 715, the computing device 105 selects a vehicle 101 control mode, typically according to the environmental data 115 and the human operator data 115. For example, if the human operator data 115 indicate that the human operator is asleep, the computing device 105 may operate in the fully autonomous mode. In another example, if the human operator data indicate that the human operator has recently awoken from being asleep, the computing device 105 may operate in the limited shared mode. In yet another example, if the environmental data indicate a steep hill, the computing device 105 may operate in the shared mode, setting limits of the virtual operator to prevent sharp turns of the steering wheel. The available modes may be restricted based on the human operator data, e.g., if the human operator is asleep, the manual mode may not be available.

Next, in a block 720, the computing device 105 selects an operation mode based on the control state. The operation modes define when vehicle subsystems 107 accept input from the human operator and/or the virtual operator. For example, the manual state corresponds to a manual operation mode, where the vehicle subsystems 105 accept only human operator input. In another example, the limited shared state corresponds to a limited shared operation mode, where certain vehicle subsystems 107 accept input from the virtual operator only while other vehicle subsystems 107 accept human operator input.

Next, in a block 725, the computing device 105 adjusts operation of at least one vehicle subsystem 107 based on the operation state. For example, if the vehicle 101 is operating in the shared operation state, the computing device 105 may adjust, e.g., the propulsion subsystem 107 to prevent a human operator from accelerating faster than the virtual operator limit.

Next, in a block 720, the computing device 105 determines whether to continue the process 700. If the computing device 105 determines to continue, the process 700 returns to the block 705 to collect more data. Otherwise, the process 700 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, or the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
  establish, for one or more parameters of operation of a vehicle including at least one of acceleration, speed, trajectory, braking, and torque, upper and lower limits for each of a plurality of states of operation of the vehicle, the states of operation specifying limits of manual deviation of the parameters from prescribed values of the parameters determined by a virtual operator;
  identify one of the plurality of states as a current operating state of the vehicle based at least in part on biometric data describing a human operator and data describing an environment around the vehicle;
  actuate at least one vehicle subsystem according to an operation mode corresponding to the current operating state;
  collect additional biometric data describing the human operator while actuating the vehicle subsystem to maintain current values of the parameters according to the current operating state; and identify, based at least in part on the additional biometric data, a second state that is different from the current operating state.

2. The system of claim 1, wherein the operation modes include two or more of:
 a manual mode, in which the vehicle subsystem accepts input only from the human operator;
 a fully autonomous mode, in which the vehicle subsystem accepts input only from the virtual operator;
 a shared operation mode, in which the vehicle subsystem accepts input from the human operator that is within the one or more parameters; and
 a limited shared operation mode, in which the vehicle subsystem accepts input from the virtual operator unless instructed by the computer to accept input from the human operator.

3. The system of claim 2, wherein the instructions further include instructions to restrict the modes to one of the shared operation mode and the manual mode when the vehicle subsystem is in the manual mode.

4. The system of claim 2, wherein the instructions further include instructions to restrict the modes to one of the fully autonomous mode and the limited shared operation mode.

5. The system of claim 1, wherein the instructions further include instructions to restrict the available operation modes based on the data describing the human operator.

6. The system of claim 1, wherein the operation modes include a fully autonomous operation mode and a fully manual operation mode for each of a plurality of vehicle subsystems.

7. The system of claim 6, wherein the instructions further include instructions to select one of the modes for each vehicle subsystem based on the operator data.

8. The system of claim 1, wherein the vehicle subsystem includes at least one of vehicle propulsion, steering, and braking.

9. The system of claim 1, wherein the instructions further include instructions to adjust the upper and lower limits of the one or more parameters based on the operator data.

10. A method, comprising:
 establishing, for one or more parameters of operation of a vehicle including at least one of acceleration, speed, trajectory, braking, and torque, upper and lower limits for each of a plurality of states of operation of the vehicle, the states of operation specifying limits of manual deviation of the parameters from prescribed values of the parameters determined by a virtual operator;
 identifying one of the plurality of states as a current operating state of the vehicle based at least in part on biometric data describing a human operator and data describing an environment around the vehicle; and
 actuating at least one vehicle subsystem according to an operation mode corresponding to the current operating state;
 collecting additional biometric data describing the human operator while actuating the vehicle subsystem to maintain current values of the parameters according to the current operating state; and
 identifying, based at least in part on the additional biometric data, a second state that is different from the current operating state.

11. The method of claim 10, wherein the operation modes include at least two or more of:
 a manual mode, in which the vehicle subsystem accepts input only from the human operator;
 a fully autonomous mode, in which the vehicle subsystem accepts input only from the virtual operator;
 a shared operation mode, in which the vehicle subsystem accepts input from the human operator that is within the one or more parameters; and
 a limited shared operation mode, in which the vehicle subsystem accepts input from the virtual operator unless instructed by the computer to accept input from the human operator.

12. The method of claim 11, further comprising restricting the modes to one of the shared operation mode and the manual mode.

13. The method of claim 11, further comprising restricting the modes to one of the fully autonomous mode and the limited shared operation mode when the vehicle subsystem is in the fully autonomous mode.

14. The method of claim 10, further comprising restricting the available modes based on data describing the human operator.

15. The method of claim 10, wherein the modes include a fully autonomous operation mode and a fully manual operation mode for each of a plurality of vehicle subsystems.

16. The method of claim 15, further comprising selecting one of the modes for each vehicle subsystem based on the operator data.

17. The method of claim 10, wherein the vehicle subsystem includes at least one of vehicle propulsion, steering, and braking.

18. The method of claim 10, further comprising adjusting the upper and lower limits of the one or more parameters based on the operator data.

* * * * *